(12) United States Patent
Farmer et al.

(10) Patent No.: US 6,198,998 B1
(45) Date of Patent: Mar. 6, 2001

(54) OCCUPANT TYPE AND POSITION DETECTION SYSTEM

(76) Inventors: Michael E. Farmer, 161 Woodcreek Ct., Commerce, MI (US) 48390; Michael P. Bruce, 5384 Lawnwood Dr., Brighton, MI (US) 48116

( * ) Notice: Subject to any disclaimer, the term of this patent is extended or adjusted under 35 U.S.C. 154(b) by 0 days.

(21) Appl. No.: 09/368,251

(22) Filed: Aug. 3, 1999

Related U.S. Application Data

(63) Continuation of application No. 08/841,521, filed on Apr. 23, 1997, now Pat. No. 6,005,958.

(51) Int. Cl.[7] .............................. G06F 17/00; G06F 7/00
(52) U.S. Cl. .......................... 701/45; 382/103; 382/104; 382/106; 340/438
(58) Field of Search ............................ 701/45; 382/103, 382/104, 106; 280/735; 180/268, 271; 340/438

(56) References Cited

U.S. PATENT DOCUMENTS

| | | | |
|---|---|---|---|
| 3,788,749 | 1/1974 | George | 356/239 |
| 4,625,329 | 11/1986 | Ishikawa et al. | 382/1 |
| 5,003,166 | 3/1991 | Girod | 250/201.4 |
| 5,074,583 | 12/1991 | Fujita et al. | 280/735 |
| 5,314,037 | 5/1994 | Shaw et al. | 180/169 |
| 5,366,241 | 11/1994 | Kithill | 280/735 |
| 5,398,185 | 3/1995 | Omura | 364/424.05 |
| 5,413,378 | 5/1995 | Steffens, Jr. et al. | 280/735 |
| 5,446,661 | 8/1995 | Gioutsos et al. | 364/424.05 |
| 5,490,069 | 2/1996 | Gioutsos et al. | 280/735 |
| 5,528,698 | 6/1996 | Kamei | 382/100 |
| 5,531,472 | 7/1996 | Semchena et al. | 280/735 |
| 5,653,462 | 8/1997 | Breed et al. | 280/735 |

*Primary Examiner*—William A. Cuchlinski, Jr.
*Assistant Examiner*—Gertrude Arthur
(74) *Attorney, Agent, or Firm*—Lyon PC

(57) ABSTRACT

A method and system (10) for detecting vehicle occupant type and position utilizes a single camera unit (12) positioned, for example at the driver or passenger side A-pillar, to generate image data of the front seating area of the vehicle. The present invention distinguishes between objects, forwardly or rearwardly facing child seats, and occupants, by periodically mapping the image taken of the interior of the vehicle into an image profile (104), and utilizing image profile matching with stored profile data (110) to determine the occupant or object type. The system and method of the present invention track occupant type and position in both parallel and perpendicular directions relative to a fixed structure such as the vehicle instrument panel to optimize both the efficiency and safety in controlling deployment of a occupant safety device, such as an air bag (28).

19 Claims, 3 Drawing Sheets

OCCUPANT TYPE AND POSITION DETECTION SYSTEM

CROSS-REFERENCE TO RELATED APPLICATIONS

The instant application is a continuation of U.S. application Ser. No. 08/841,521 filed on Apr. 23, 1997 now U.S. Pat. No. 6,005,958, which is incorporated herein by reference.

TECHNICAL ART

The present invention relates generally to motor vehicle crash discrimination systems utilized for actuating or deploying a passenger safety restraint, and more specifically to a system and method for detecting occupant seating conditions so as to optimize deployment of a passenger safety restraint.

BACKGROUND OF THE INVENTION

Conventional vehicle crash discrimination systems typically employ at least one mechanical, electromechanical, or electronic acceleration sensor affixed to the vehicle for sensing vehicle acceleration. The output of the sensors are supplied to a discrimination circuit for comparison to a predetermined threshold value. If the predetermined threshold value is exceeded, the discrimination circuit will output a signal which actuates or deploys a passenger safety restraint, such as an air bag or passive seat belt mechanism.

However, conventional mechanical or electromechanical accelerometer based crash discrimination systems do not account for variations in passenger/occupant conditions in determining whether to actuate the safety restraint. More specifically, conventional accelerometer based crash discrimination systems are generally designed to assume nominal conditions, such as 50th percentile male, actual presence of a vehicle occupant, and failure of an occupant to wear a seat belt. The assumption of these crash conditions are necessary to insure proper actuation of the safety restraint when severe deceleration of the vehicle is detected by the accelerometer. Such assumptions inherently cause unnecessary, undesired, or improperly-timed actuation of the safety restraint in conditions where no occupant is present, in marginal crash situations where a seat belt provides sufficient safety protection for the occupant, or in situations where the occupant is improperly positioned relative to the safety restraint such that actuation of the safety restraint could potentially injure the occupant.

Thus, since conventional crash discrimination systems can not accommodate various occupant conditions which affect the desirability of actuating the safety restraint, they have not proven to be completely satisfactory. In response, the prior art has attempted to overcome these deficiencies by providing arrangements which are generally directed at detecting occupant presence, size, or position relative to some fixed structure in the vehicle. The following are examples of such prior art arrangements.

U.S. Pat. No. 5,413,378 to Steffens, Jr., et al disclose a system for controlling an occupant restraint, such as an air bag, wherein the system utilizes a combination of a set of ultrasonic occupant position sensors, and various seat and occupant weight sensors, to determine occupant weight and position relative to fixed structure with the vehicle.

U.S. Pat. No. 5,398,185 to Omura discloses a system for optimizing deployment of passenger restraint devices which utilizes a combination of a plurality of seat sensors, a card reader for inputting data regarding the physical characteristics of the occupant, and two telecameras to compute a value characteristic of each interior vehicle element and the occupant's estimated behavior relative thereto.

U.S. Pat. No. 5,366,241 to Kithil discloses an overhead-mounted air bag deployment system which utilizes an overhead passenger sensor array to sense position and velocity of an occupant's head so as to control deployment of an air bag, and to detect and provide warning when the occupant is in an unsafe seated condition.

U.S. Pat. No. 5,074,583 to Fujita et al disclose a vehicle collision detection system which utilizes a plurality of seat-mounted sensors to detect occupant seating condition, position, and size in order to optimize inflation of an air bag in a vehicle collision.

In addition, commonly owned U.S. Pat. Nos. 5,446,661 and 5,490,069 each disclose a method and system for vehicle crash discrimination which continuously detects various vehicle occupant positions for optimizing a discrimination analysis to achieve increased efficiency and reliability in actuating a safety restraint.

While these arrangements may have provided an improvement in efficiency over conventional crash discrimination systems, there still exits a need for a crash discrimination system which can further optimize or tailor air bag deployment based on the specific type of occupant present in the vehicle. More specifically, with the increased use and availability of air bags in motor vehicles has come the realization that deployment of an air bag in certain crash situations, and with certain types of occupants, such as infants strapped into a child safety seat, has the potential of causing more harm to the occupant than if the air bag were not deployed.

As noted above, this problem has become particularly acute with infant safety seats. The prior art has attempted to distinguish passengers from infant child seats by using conventional distance measuring techniques to detect the amount and extent of possible occupant movement, or alternatively has used weight sensing arrangements to detect the weight of any object which might be located on the vehicle seat. In either arrangement, threshold values are used to classify an object as either a passenger or an inanimate object.

However, simply using weight sensors or movement monitoring has not provided the level of discrimination between occupant types or the reliability necessary to achieving effective "smart" control over air bag deployment. As a result, a need still exists for a system which can automatically and continually determine occupant type and position in a reliable and cost effective manner.

SUMMARY OF THE INVENTION

It is therefore an object of the present invention to provide a system and method which automatically determines the type of occupant in a vehicle seat, as well as the location of that occupant within the seat relative to fixed structure in the interior of the vehicle, such as the dashboard or steering wheel, so as to increase efficiency and reliability in actuating or deploying a safety restraint such as an air bag.

It is another object of the present invention to provide a system and method which is capable of detecting the presence of either a person, a rearward facing infant car seat, a forward facing infant car seat, or a box or other inanimate object, so as to increase efficiency and reliability in actuating or deploying a safety restraint such as an air bag.

It is a further object of the present invention to provide a system and method which determines if an occupant is in an unsafe seated position to optimize control over deployment of an occupant safety restraint such as an air bag or other passive restraint device.

In accordance with these and other objects, the present invention provides a system and method which detects occupant position and type which utilizes a single camera unit positioned for example at the driver or passenger side A-pillar. The present invention provides a system and method which distinguishes between objects, forwardly or rearwardly facing infant seats, and adult occupants by periodically mapping an image taken of the interior of the vehicle into image profile data, and utilizing image profile matching with stored reference profile data to determine the occupant or object type. Instantaneous distance is also measured and changes in the measured distances are tracked. All of this information is than used to optimize deployment control of at least one passenger safety restraint.

Thus, in accordance with a first aspect of the present invention, a system for determining vehicle occupant type and position relative to a fixed structure within the vehicle comprises an imaging means mounted at a single location within the vehicle interior and having a predetermined field of view so that a front driver side seat and a front passenger side seat are both simultaneously viewable by said imaging means, but not simultaneously in focus as described more fully hereinbelow. The imaging means generates an output signal representative of an instantaneous position for any object located within the field of view. The system further includes means for storing predetermined object profile data characteristic of a plurality of different types of objects when situated in either front seat of the vehicle, and a processor means for identifying the type of object located in the front seats of the vehicle by comparing the imaging means output signal to the predetermined object profile data.

In accordance with a second aspect of the present invention, a method for determining position of an object located in a vehicle relative to a fixed structure within the vehicle comprises the steps of generating two-dimensional image data representative of any objects located within a front seating area of the vehicle, generating a two-dimensional range grid by vertically dividing the front seating area into a plurality of independent regions each representative of a predetermined size of the vehicle interior, wherein the fixed vehicle structure such as the instrument panel is located proximate to one end region, and the vehicle front seats are located proximate with the opposite end region, detecting lateral location of the object relative to a narrow depth of focus reference plane using a de-blurring filter, and determining distance from the fixed structure by comparing the generated image data with the range grid to detect which if any of the plurality of regions are occupied by an object.

In achieving both of these aspects, the system and method of the present invention further comprise discriminating between objects and occupants; A-pillar positioning of the imaging system; use of a perspective angle correction lens; use of a two-dimensional range grid; tracking the change in instantaneous occupant position to predict a crash situation; optimization of passenger restraint deployment based on the identification of occupant type and position; generating the two-dimensional range grid by either etching the grid on a lens element, printing the grid on a CCD element, or utilizing suitable programming in a processor means; and estimating occupant lateral distance from a fixed vehicle interior component by utilizing a narrow depth of focus lens in combination with suitable electromechanical or image processing auto-focus techniques.

The present invention will be more fully understood upon reading the following detailed description of the preferred embodiment in conjunction with the accompanying drawings.

DETAILED DESCRIPTION OF THE PREFERRED EMBODIMENT(S)

Figure 1:
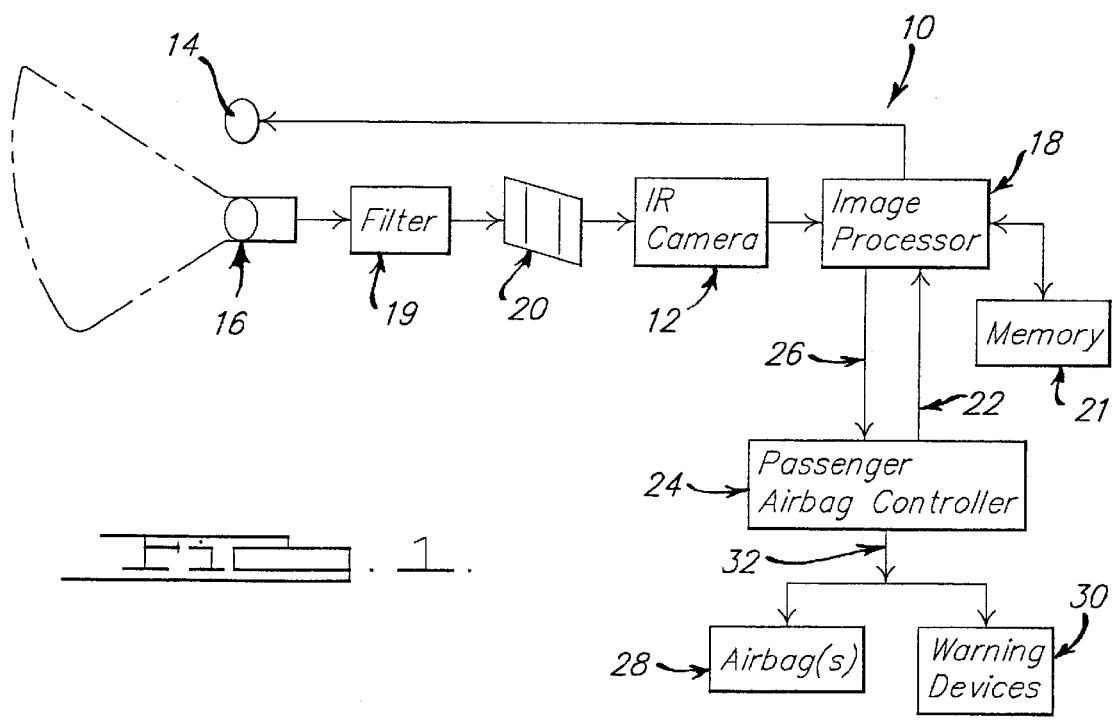
FIG. 1 is a schematic illustration of a vehicle occupant type and position detection system in accordance with the present invention.
Figure 2:
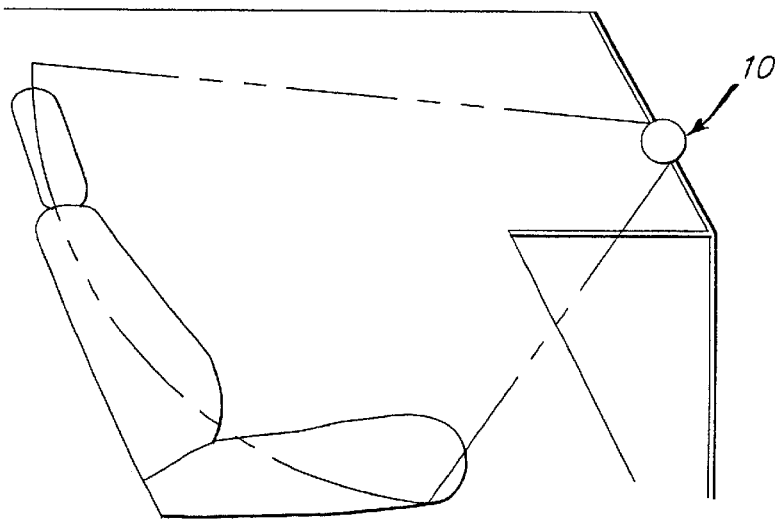
FIG. 2 is a side view of the vehicle interior showing location of the system of the present invention.

Referring to FIG. 1, there is shown a system 10 which determines vehicle occupant position and type in accordance with the present invention. In accordance with the preferred embodiment, system 10 is suitably adapted for mounting in a single location, such as the driver or passenger side A-pillar location as shown in FIG. 2, so as to have a field of view allowing the system to "see" any region within the driver side seat and the passenger side seat area for a given focal depth. The use of a single location advantageously reduces the amount of necessary hardware, and therefore the cost and complexity of manufacturing and installation of the present invention.

More specifically, in accordance with the preferred embodiment, a single camera unit 12 is located at the A-pillar or similar location so as to have a perspective field of view simultaneously covering both driver and passenger side seats. The camera unit 12 is preferably a low light infra red (IR) sensitive type camera system, and is arranged to provide all light operation through the inclusion of a supplemental light source, such as represented by an LED 14. However, one of ordinary skill in the art will readily appreciate that other types of camera systems may be suitable, and as such the use of an IR camera system 12 is not to be construed as limiting the present invention.

Figure 3:
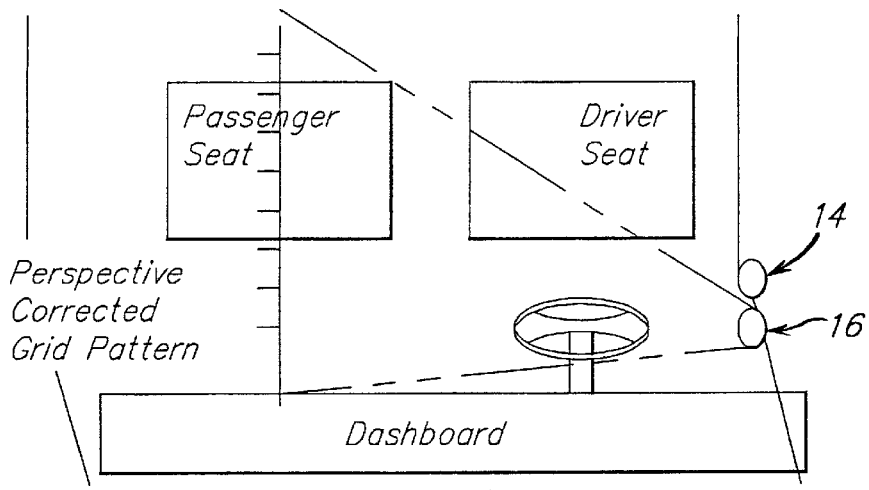
FIG. 3 is a downward view of the vehicle interior illustrating the field of view for the system of the present invention.

A perspective angle correcting lens 16 is employed to translate the perspective image of the interior of the vehicle into a two-dimensional image signal which is then output to an image processor 18. In other words, lens 16 is optically designed to effectively remove the "perspectiveness" of the image created by the slant angle of the camera 12 with respect to a plane passing perpendicular to the instrument panel through the center of the passenger seat, as more clearly shown in FIG. 3. The correction lens 16 removes distortion in the image pixels inherently caused by the perspective view and makes the pixels all equal in actual distance spacing as if being two-dimensionally viewed from the side of the vehicle.

In further accordance with the present invention, system 10 utilizes a de-blurring filter arrangement 19 in conjunction with a narrow depth of focus reference plane. With a narrow depth of focus, points along a perpendicular plane are in focus, and objects either farther or closer than this plane are out of focus. Thus, the location of an object relative to the focus plane can be inferred from the amount of blur in the image, i.e., the farther an object is laterally displaced from the focus plane, the more the image will be blurred.

The de-blurring filter, while symbolically shown in FIG. 1, is preferably implemented as an algorithm subroutine in image processor 18. Therefore, with a narrow depth of focus and de-blurring filter arrangement, image processor 18 is able to infer or estimate the location of an object relative to the focus plane, while also being able to ignore or distinguish background clutter within the viewable image, such as door features or the driver depending on which side of the car the system is located, from the desired image of the occupant or object within the seat.

The system 10 further includes a grid pattern 20 that is either etched on the lens 16, screen printed on a CCD, or implemented by suitable programming within the image processor 18. This grid pattern is customized for each model of automobile, and as best illustrated in FIGS. 4(a)–(b) and 5(a)–(b) provides an actual distance spacing metric for the pixels in the image along the plane perpendicular to the instrument panel. As described hereinbelow, the grid pattern 20 is the mechanism by which the image processor 18 will be able to measure the actual distance of objects within the image focal plane, and to otherwise detect dominate features of an object or occupant located in the vehicle seat. The grid is effectively normalized by using lateral location derived from the narrow depth of focus reference plane and the de-blurring filter arrangement.

In addition, the light source is preferably etched with a matching pattern of grid marks. The relative warping of the transmitted light by the occupant provides for detection of fine shape features which may not be otherwise discernable in poor lighting conditions due to reduced image contrast. Such a warped grid analysis also provides a three-dimensional profile of the occupant which can be used in conjunction with the detected lateral distance to provide comprehensive information regarding occupant size, shape, and location within a vehicle seat.

Figure 5A:
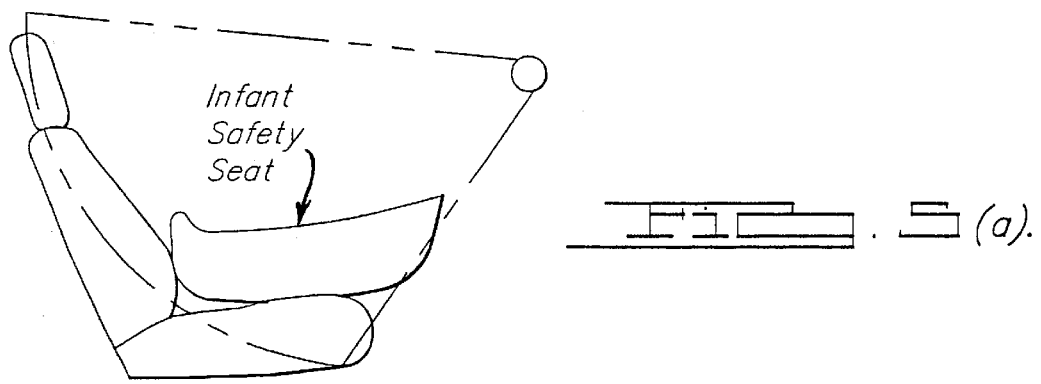
FIGS. 5(a) and (b) are a side view of an infant safety seat and the corresponding two dimensional ranging grid image of the present invention.
Figure 5B:
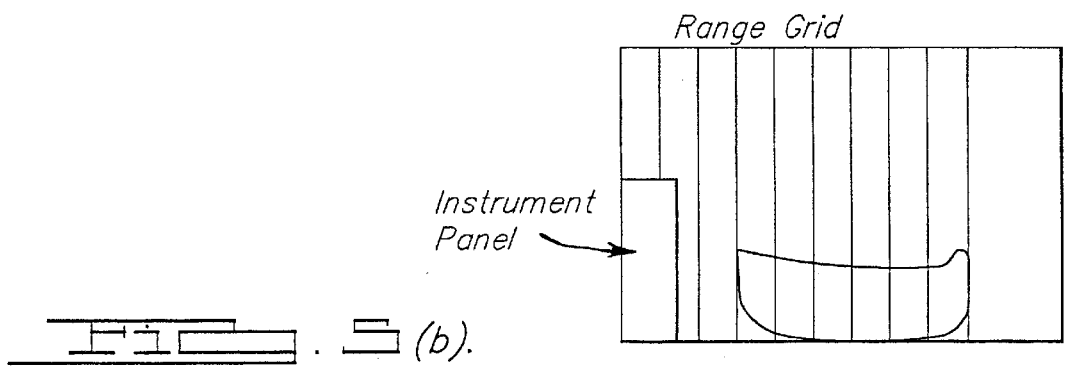
Figure 6:
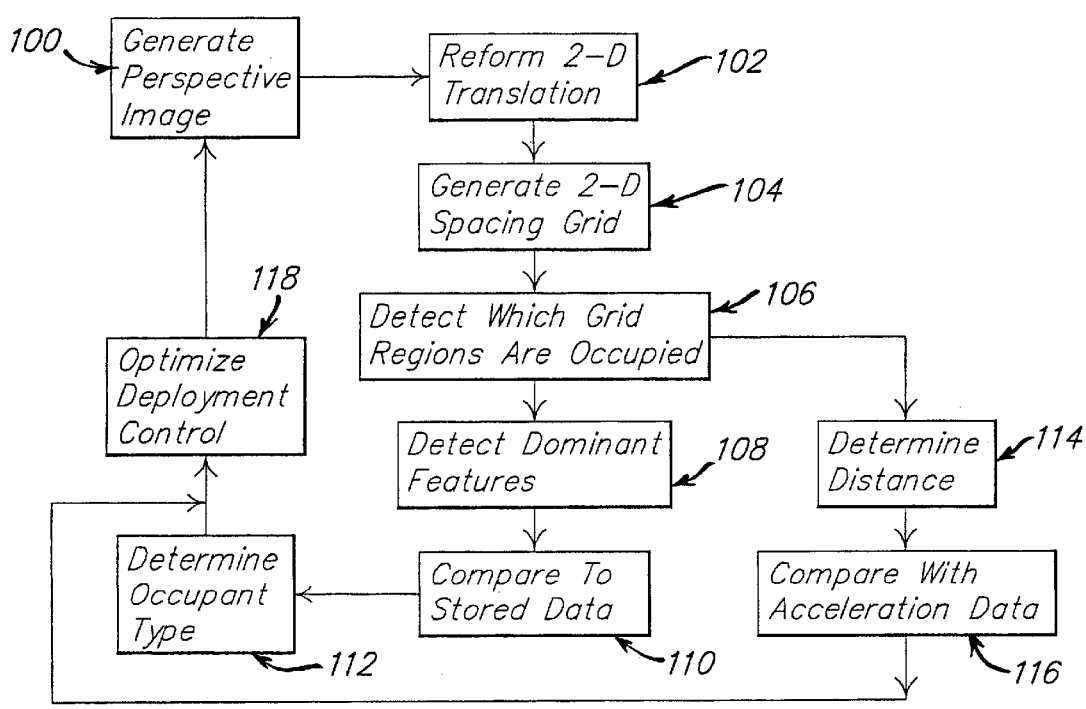
FIG. 6 is a flowchart illustrating the operation of the present invention.

The overall operation of the present invention as well as the remaining elements of FIG. 1 will now be discussed in context with the flow chart shown in FIG. 6. At step 100, the camera unit 12 generates a perspective image signal which is translated at step 102 by lens 16 into a two-dimensional image data signal representative of the profile of any objects located within a front seat of the vehicle. At step 104, a two-dimensional spacing or range grid is created by vertically dividing the two-dimensional image of the front vehicle seating area into a plurality of independent regions each representative of a predetermined size of the vehicle interior. The grid is oriented so as to substantially locate the fixed vehicle structure at one end region, and the vehicle front seats substantially at the opposite end region, as particularly shown in FIGS. 4(b) and 5(b).

Figure 4A:
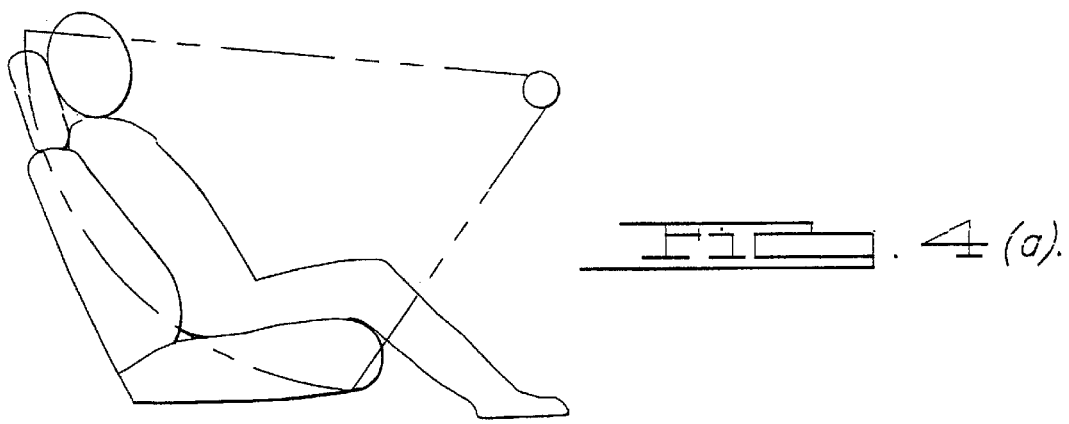
FIGS. 4(a) and (b) are a side view of a "person" type occupant and the corresponding two dimensional ranging grid image of the present invention.
Figure 4B:
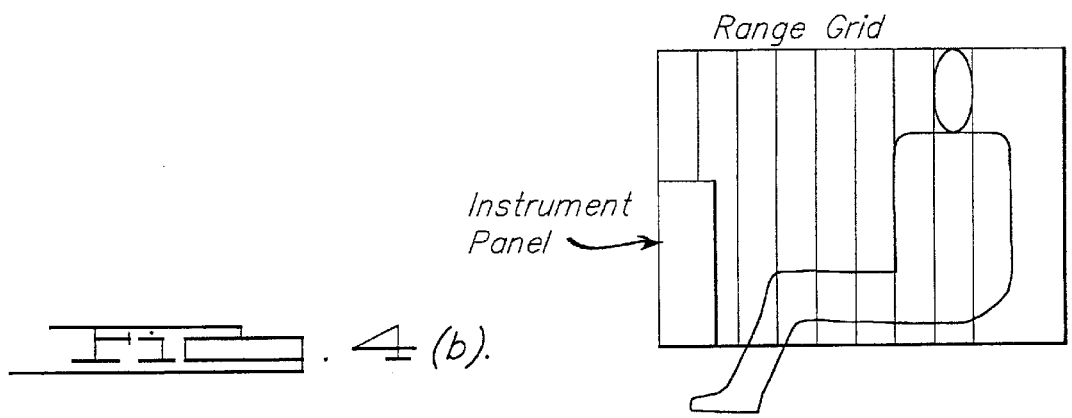

At step 106, the two-dimensionally generated image data is analyzed against the spacing grid to detect which if any of the plurality of regions are occupied by an object or occupant. The image processor 18 utilizes an image analysis algorithm which detects the dominant features and position of the object located in the vehicle seat at step 108. These features include the relative extent of the vertical portion of the occupant relative to the horizontal portion as shown in FIGS. 4(b) or 5(b).

Object profile data representative of a set of reference features of various types of occupants, such as humans, forward and rearward facing infant safety seats, or other inanimate objects, are stored in a suitable memory device 21, such as a RAM or EEPROM. The stored sets of reference features are scaled to allow identification of a complete range of occupant sizes, i.e., small children to large adults. In addition, since there are a variety of different sized infant seats, a size invariant classification of reference features is provided for proper identification of infant seats. Image processor 18 than determines occupant type at step 112 by mapping or comparing the detected dominant features of the two dimensional image signal with the set of reference features stored in memory 21 at step 110.

In addition to determining occupant type, the distance between the occupant and the instrument panel or steering wheel of the vehicle is detected at step 114 by measuring the relative location of the occupant based on the regions of the two-dimensional grid which are detected as being occupied at step 106. The actual distance is derived by combining the measured location within the grid with the lateral location of the object relative to narrow focus plane provided by the camera lens as determined by the de-blurring filter operation.

The motion of the occupant is determined by looking for areas of relative motion and instantaneous distance changes through the grid zones, and to estimate the relative speed of the motion in these areas. Such information and the respective instantaneous changes in distance are stored, such as in memory 21. At step 116, the data generated from this process is compared with contemporaneous vehicle speed data input on a line 22 from a centralized microprocessor air bag deployment control unit 24, or directly from one or more vehicle acceleration sensors (not shown). This comparison step facilitates an analysis by either processor 18 or 24 of the motions of the occupants during either precrash or noncrash braking situations, which subsequently allows processor 24 to predict the onset of a crash and/or to develop an optimal deployment strategy for the air bags, or other restraints such as pretensioners and energy management systems.

After determining occupant type and position at steps 112 and 116 respectively, at step 118 the image processor 18 provides an output signal 26 to the control unit 24, which subsequently optimizes control over the actuation, or deployment, of one or more passenger safety restraints, such as an air bag 28, or the activation of an audible or visual warning device(s) 30 via at least one output line 32. The warning devices 30 provide an alert for the vehicle occupant of a potentially hazardous seating condition.

Therefore, with the present invention, the vehicle occupant type and position detection system 10 is designed to provide both high frequency detection of the type of occupant or object located in a vehicle, and measurements of the position of the driver and/or passengers relative to potential impact points such as the steering wheel and dashboard, and to process that information so as to provide an optimized safety restraint deployment decision. The system 10 thus allows the deployment control processor unit 24 to refrain from deploying an air bag when a infant safety seat is present, particularly a rearward facing infant seat, or when a person is present but is too close, thereby preventing the explosive force with which an air bag is inflated from doing substantial harm to the infant or person.

It will be further understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

We claim:

1. A method for determining position of an object located in a vehicle relative to a fixed structure within the vehicle comprising the steps of:
   a. generating two-dimensional image data representative of any objects located within a front seating area of the vehicle; and
   b. detecting the location of the object relative to a narrow depth of focus reference plane using a de-blurring filter, wherein said narrow depth of focus lens has an optic axis and said de-blurring filter cooperates with said narrow depth of focus lens to provide a measure of distance along said optic axis to said object within the field of view relative to the fixed structure of the vehicle.

2. A method for determining position of an object located in a vehicle relative to a fixed structure within the vehicle as recited in claim 1, further comprising the operation selected from the group consisting of controlling the deployment of a safety restraint system responsive to said measure of distance and optimizing the deployment of a safety restraint system responsive to said measure of distance.

3. A method for determining position of an object located in a vehicle relative to a fixed structure within the vehicle as recited in claim 1, further comprising the step of storing instantaneous measurements of distance.

4. A method for determining position of an object located in a vehicle relative to a fixed structure within the vehicle as recited in claim 3, further comprising the operation selected from the group consisting of controlling the deployment of a safety restraint system responsive to said instantaneous measurements of distance and optimizing the deployment of a safety restraint system responsive to said instantaneous measurements of distance.

5. A method for determining position of an object located in a vehicle relative to a fixed structure within the vehicle as recited in claim 4, further comprising the step of tracking changes in said instantaneous measurements of distance.

6. A method for determining position of an object located in a vehicle relative to a fixed structure within the vehicle as recited in claim 5, further comprising the operation selected from the group consisting of controlling the deployment of a safety restraint system responsive to the tracked changes in said instantaneous measurements of distance and optimizing the deployment of a safety restraint system responsive to the tracked changes in said instantaneous measurements of distance.

7. A system for determining position of an object located in a vehicle relative to a fixed structure within the vehicle comprising:
   a. a camera mounted within the vehicle interior and having a field of view so that a front driver side seat and a front passenger side seat are both simultaneously viewable by said imaging means but not simultaneously in focus, wherein said camera generates an output signal representative of an instantaneous position of any object located within the field of view;
   b. a narrow depth of focus lens operatively coupled to said camera, wherein said narrow depth of focus lens has an optic axis; and
   c. a de-blurring filter, wherein said de-blurring filter cooperates with said narrow depth of focus lens to provide a measure of distance along said optic axis to said object within the field of view relative to the fixed structure of the vehicle.

8. A system for determining position of an object located in a vehicle relative to a fixed structure within the vehicle as recited in claim 7, wherein said camera is mounted at a single location within said vehicle interior.

9. A system for determining position of an object located in a vehicle relative to a fixed structure within the vehicle as recited in claim 7, wherein said single location comprises a vehicle A-pillar.

10. A system for determining position of an object located in a vehicle relative to a fixed structure within the vehicle as recited in claim 7, further comprising a processor operatively coupled to said de-blurring filter for providing said measure of distance.

11. A system for determining position of an object located in a vehicle relative to a fixed structure within the vehicle as recited in claim 10, wherein said processor incorporates a de-blurring algorithm.

12. A system for determining position of an object located in a vehicle relative to a fixed structure within the vehicle as recited in claim 7, further comprising a means for storing instantaneous measurements of distance.

13. A system for determining position of an object located in a vehicle relative to a fixed structure within the vehicle as recited in claim 12, further comprising a means for tracking changes in said instantaneous measurements of distance.

14. A system for determining position of an object located in a vehicle relative to a fixed structure within the vehicle as recited in claim 13, further comprising a safety restraint system, wherein said safety restraint system is responsive to a characteristic selected from the group consisting of said instantaneous measurement of distance and the tracked changes in said instantaneous measurement of distance.

15. A system for determining position of an object located in a vehicle relative to a fixed structure within the vehicle as recited in claim 13, further comprising a safety restraint system and a means for optimizing the deployment of said safety restraint system responsive to a characteristic selected from the group consisting of said instantaneous measurement of distance and the tracked changes in said instantaneous measurement of distance.

16. A system for determining position of an object located in a vehicle relative to a fixed structure within the vehicle as recited in claim 7, further comprising a safety restraint system, wherein said safety restraint system is responsive to said measure of distance.

17. A system for determining position of an object located in a vehicle relative to a fixed structure within the vehicle as recited in claim 7, further comprising a safety restraint system and a means for optimizing the deployment of said safety restraint system responsive to said measure of distance.

18. A system for determining position of an object located in a vehicle relative to a fixed structure within the vehicle as recited in claim 7, further comprising a warning device, wherein said warning device is responsive to said measure of distance.

19. A system for determining position of an object located in a vehicle relative to a fixed structure within the vehicle as recited in claim 7, further comprising a perspective angle correction lens for translating the predetermined field of view from a perspective view to a two-dimensional view.

* * * * *

UNITED STATES PATENT AND TRADEMARK OFFICE
CERTIFICATE OF CORRECTION

PATENT NO. : 6,198,998 B1
DATED : March 6, 2001
INVENTOR(S) : Farmer et al.

It is certified that error appears in the above-identified patent and that said Letters Patent is hereby corrected as shown below:

<u>Title page,</u>
Item [73], Assignee, should read:

-- Automotive Systems Laboratory, Inc.
27200 Haggerty Road
Suite B-12
Farmington Hills, Michigan 48331 --

Signed and Sealed this

Twenty-fifth Day of June, 2002

Attest:

Attesting Officer

JAMES E. ROGAN
*Director of the United States Patent and Trademark Office*